(12) United States Patent
Watanabe et al.

(10) Patent No.: US 11,143,250 B2
(45) Date of Patent: Oct. 12, 2021

(54) CONTROL SYSTEM AND CONTROL METHOD FOR VEHICLE

(71) Applicant: TOYOTA JIDOSHA KABUSHIKI KAISHA, Toyota (JP)

(72) Inventors: Hideo Watanabe, Toyota (JP); Ryosuke Mizuto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/990,118

(22) Filed: Aug. 11, 2020

(65) Prior Publication Data

US 2021/0140496 A1 May 13, 2021

(30) Foreign Application Priority Data

Nov. 13, 2019 (JP) .............................. JP2019-205527

(51) Int. Cl.
| | |
|---|---|
| *F16D 48/08* | (2006.01) |
| *F16D 13/52* | (2006.01) |
| *F16D 13/72* | (2006.01) |
| *F16D 21/00* | (2006.01) |
| *F16D 13/74* | (2006.01) |
| *F16D 21/08* | (2006.01) |

(52) U.S. Cl.
CPC ............. *F16D 48/08* (2013.01); *F16D 13/52* (2013.01); *F16D 13/72* (2013.01); *F16D 21/00* (2013.01); *F16D 13/74* (2013.01); *F16D 21/08* (2013.01); *F16D 2500/1045* (2013.01); *F16D 2500/1085* (2013.01); *F16D 2500/10412* (2013.01); *F16D 2500/30404* (2013.01); *F16D 2500/30406* (2013.01); *F16D 2500/30412* (2013.01); *F16D 2500/30426* (2013.01); *F16D 2500/3109* (2013.01); *F16D 2500/3111* (2013.01)

(58) Field of Classification Search
None
See application file for complete search history.

(56) References Cited

U.S. PATENT DOCUMENTS

2017/0241546 A1    8/2017   Sasahara et al.

FOREIGN PATENT DOCUMENTS

| JP | 2017-150533 A | 8/2017 |
| JP | 2018-159419 A | 10/2018 |

*Primary Examiner* — Timothy Hannon
(74) *Attorney, Agent, or Firm* — Oliff PLC (57) ABSTRACT

The disclosure is concerned with control system and control method, for a vehicle including a driving power source, drive wheels, a first clutch, and a second clutch. An electronic control unit, which is included in the control system, places the first clutch in a half-engaged state with a predetermined clutch torque capacity, when the vehicle is started, performs start control in a first mode using the second clutch, by gradually increasing a clutch torque capacity of the second clutch from a released state, and switches the start control from the first mode using the second clutch to a second mode using the first clutch, when the increased clutch torque capacity of the second clutch reaches the clutch torque capacity of the first clutch.

10 Claims, 4 Drawing Sheets

CONTROL SYSTEM AND CONTROL METHOD FOR VEHICLE

CROSS-REFERENCE TO RELATED APPLICATION

This application claims priority to Japanese Patent Application No. 2019-205527 filed on Nov. 13, 2019, incorporated herein by reference in its entirety.

BACKGROUND

1. Technical Field

The disclosure relates to control system and control method for controlling a vehicle on which an automatic transmission is installed, and in particular to vehicular control system and control method for controlling operation of clutches, when the vehicle is started.

2. Description of Related Art

Generally, in a vehicle on which an automatic transmission is installed, a torque converter that serves as a starting device is provided between an engine and the automatic transmission. The use of the torque converter makes it possible to amplify output torque of the engine in a low-rotational-speed range, and provide large drive power for starting. Then, the vehicle can be smoothly started, through smooth power transmission via fluid. In the meantime, a vehicle having no torque converter is also known, which is used when a high-powered engine capable of generating large torque in a low-rotational-speed range is installed on the vehicle, or for the purpose of enhancing response in torque transmission, and achieve swift operation feeling during starting or acceleration. In the vehicle on which no torque converter is installed, a clutch provided in the automatic transmission, or a starting clutch provided between the engine and the automatic transmission, for example, is brought into slip engagement upon starting, so that power of the engine is transmitted to drive wheels, to generate drive power. Thus, so-called "friction start" is performed.

In Japanese Unexamined Patent Application Publication No. 2018-159419 (JP 2018-159419 A), a vehicular control system for starting a vehicle through the friction start is described. The control system described in JP 2018-159419 A has a first clutch provided as a starting device, and a second clutch provided in an automatic transmission. When the temperature of oil is extremely low, or when the vehicle is in a soaked state for a long time, the control system is configured to start the vehicle, using the second clutch having a relatively small transmission torque capacity. More specifically, when the oil has an extremely low temperature, the first clutch having a relatively large transmission torque capacity is engaged in advance, and the second clutch having a relatively small transmission torque capacity is engaged while slipping, so that torque generated by the engine is gradually transmitted to drive wheels, to generate drive power. Namely, the control system described in JP 2018-159419 A preliminarily engages the first clutch having a large transmission torque capacity, or large drag torque, during starting, and executes the friction start using the second clutch having relatively small drag torque.

An automatic transmission configured to engage friction coupling elements with good response is described in Japanese Unexamined Patent Application Publication No. 2017-150533 A (JP 2017-150533 A). The automatic transmission described in JP 2017-150533 A includes a friction coupling element for establishing a predetermined gear ratio when the vehicle is started. The friction coupling element includes a plurality of friction plates arranged with given clearances therebetween, a piston that presses the friction plates for engagement, and a compression coil spring that forces the piston in the direction toward an engagement position of the friction plates. When the vehicle is started, the piston is moved to a position at which the clearances between the friction plates are eliminated, under the bias force of the compression coil spring.

SUMMARY

As known in the art, when a wet clutch is in a half-slipping state or slip engaging state, in a transient period of power transmission, for example, drag torque is inevitably generated due to resistance to sliding between the friction material of the clutch and the oil. Thus, when the wet clutch is used as the starting device, the load of the engine caused by the drag torque is increased. In particular, when the vehicle is started, under a condition where the vehicle is left in a soaked state for a long period of time, or the viscosity of the oil is high at an extremely low temperature, the drag torque becomes extremely large, and the starting performance of the vehicle may deteriorate. In this case, as in the control system described in JP 2018-159419 A, the first clutch having relatively large drag torque is fully engaged in advance, and the vehicle is started using the second clutch having relatively small drag torque, so that the acceleration performance is less likely or unlikely to be deteriorated.

In the control system described in JP 2018-159419 A, while starting of the vehicle is controlled with the second clutch having relatively small drag torque, the drag torque is generated since the second clutch is also a wet clutch. Thus, deterioration of the acceleration performance may not be sufficiently curbed. Also, where a clutch in which dragging of the oil is small, among some types of wet clutches, is employed, reduction of the response of the clutch can be curbed, but the heat resistance or durability of the clutch may be reduced due to small dragging of the oil, in a transient period of engagement. Thus, there is still some room for improvement, when two or more clutches are controlled to achieve both the response and durability of the clutches.

This disclosure provides control system and control method for a vehicle equipped with two or more wet clutches including a wet clutch as a starting device and a wet clutch that transmits and cuts off power in an automatic transmission, which system and method can curb reduction of the durability of the clutches, while assuring good starting performance.

A first aspect of the disclosure is concerned with a control system of a vehicle, the vehicle including a drive power source, drive wheels, a first clutch, and a second clutch. The first clutch, which is of an oil bath type, comprises a wet clutch filled with oil for cooling, and is configured to selectively transmit and cut off power on a power transmission path through which torque is transmitted between the drive power source and the drive wheels. The second clutch is of a shaft-center oil feed type in which oil is suppled from a shaft center to friction plates, and is configured to selectively transmit and cut off power on the power transmission path. The control system includes an electronic control unit, the electronic control unit being configured to: place the first clutch in a half-engaged state with a predetermined clutch torque capacity, when the vehicle is started; perform start control in a first mode using the second clutch, by gradually increasing a clutch torque capacity of the second clutch from a released state; switch the start control from the first mode using the second clutch to a second mode using the first clutch, when the increased clutch torque capacity of the second clutch reaches the clutch torque capacity of the first clutch; and transmit output torque of the drive power source to the drive wheels, to generate drive power for starting, based on operation of the first clutch and operation of the second clutch.

In the control system of the vehicle according to the first aspect, the electronic control unit may be configured to control the first clutch to the half-engaged state in advance and perform the start control with the second clutch, when the vehicle is started, and start the start control with the first clutch, and stop the start control with the second clutch, when slipping occurs in the first clutch.

In the control system of the vehicle according to the first aspect, the electronic control unit may be configured to increase the clutch torque capacity of the second clutch so as to fully engage the second clutch, when the clutch torque capacity of the second clutch reaches the clutch torque capacity of the first clutch.

In the control system of the vehicle according to the first aspect, the electronic control unit may be configured to determine the predetermined clutch torque capacity of the first clutch placed in the half-engaged state, based on at least one of a temperature of the first clutch, a temperature of the second clutch, a temperature of the oil, and an acceleration required of the vehicle.

In the control system of the vehicle according to the first aspect, the electronic control unit may be configured to perform control for establishing the half-engaged state of the first clutch, in a condition where the vehicle is stopped.

In the control system of the vehicle according to the first aspect, the first clutch may have higher durability than the second clutch, and the second clutch may have higher responsiveness than the first clutch.

In the control system of the vehicle according to the first aspect, the vehicle may include an automatic transmission on the power transmission path. The second clutch may be provided within the automatic transmission. The first clutch may be provided between the drive power source and the automatic transmission.

In the control system of the vehicle constructed as described above, the electronic control unit may be configured to fully engage the second clutch, when an input shaft speed of the second clutch becomes substantially equal to an input shaft speed of the automatic transmission.

In the control system of the vehicle according to the first aspect, the first clutch and the second clutch may be directly coupled to each other on the power transmission path.

A second aspect of the disclosure is concerned with a control method for a vehicle including a drive power source, drive wheels, a first clutch, and a second clutch. The first clutch, which is of an oil bath type, comprises a wet clutch filled with oil for cooling, and is configured to selectively transmit and cut off power on a power transmission path through which torque is transmitted between the drive power source and the drive wheels. The second clutch is of a shaft-center oil feed type in which oil is suppled from a shaft center to friction plates, and is configured to selectively transmit and cut off power on the power transmission path. The control method includes placing the first clutch in a half-engaged state with a predetermined clutch torque capacity, when the vehicle is started; performing start control in a first mode using the second clutch, by gradually increasing a clutch torque capacity of the second clutch from a released state; switching the start control from the first mode using the second clutch to a second mode using the first clutch, when the increased clutch torque capacity of the second clutch reaches the clutch torque capacity of the first clutch; and transmitting output torque of the drive power source to the drive wheels, to generate drive power for starting, based on operation of the first clutch and operation of the second clutch.

According to the control system according to the first aspect of the disclosure and the control method according to the second aspect of the disclosure, when the vehicle is started from a stopped state, the first clutch and the second clutch are controlled in coordination with each other. More specifically, while the vehicle is in the stopped state, the first clutch, which is a fully dipped clutch (oil-bath type clutch that is entirely filled with or immersed in the oil) and thus has low responsiveness, is placed in a half-engaged state in advance, and the start control is started, using the second clutch that is highly responsive to accelerator operation. Namely, the acceleration response in the initial period of starting is secured through control of the second clutch. Then, when the clutch torque capacity of the second clutch increased according to the accelerator operation exceeds the clutch torque capacity of the first clutch that is in the half-engaged standby state (in other words, when slipping occurs in the first clutch), the start control of the vehicle is switched from the first mode using the second clutch to the second mode using the first clutch. Namely, once the initial response is secured by the second clutch, the second clutch is immediately fully engaged so as not to do friction work, since the second clutch has relatively low durability, and the subsequent stage of the start control of the vehicle is performed through control of the first clutch. Since the first clutch is placed in the half-engaged standby state in advance, delay in the response is eliminated or reduced when the start control is switched from the first mode using the second clutch to the second mode using the first clutch, though the first clutch has relatively low responsiveness. Further, the durability of the clutches under the start control is less likely or unlikely to be reduced since the first clutch has high durability. With the control system of the disclosure, both the acceleration performance of the vehicle and the durability of each clutch can be ensured. Namely, unlike the known arrangement with which only the acceleration performance is ensured, or only the durability is ensured, it is possible to curb reduction of the durability of each clutch while ensuring sufficient acceleration response of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One embodiment of the disclosure will be described with reference to the drawings. The embodiment described below is a mere example of what embodies this disclosure, and is not intended to limit the disclosure.

Figure 1:
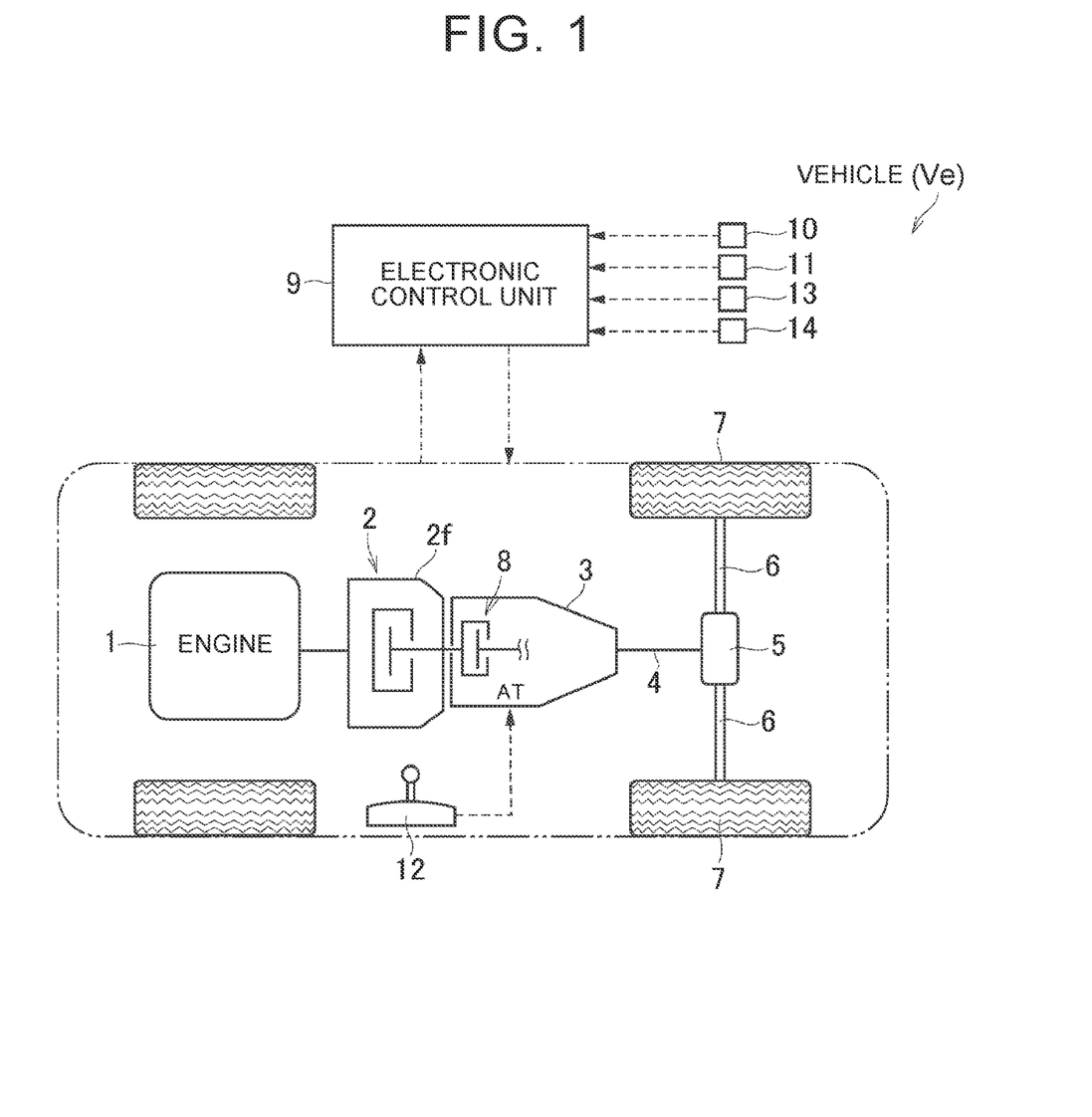
FIG. 1 is a view showing the configuration of a vehicle including a control system according to one embodiment of the disclosure.

FIG. 1 shows one example of a vehicle Ve to which this disclosure can be applied. The vehicle Ve shown in FIG. 1 includes an engine (ENG) 1 as a drive power source, and an automatic transmission (AT) 3 coupled to the output side of the engine 1, via a first clutch 2. A propeller shaft 4 is coupled to the output side of the automatic transmission 3. The propeller shaft 4 is coupled to drive wheels 7, via a differential gear set 5 as a final reduction gear, and right and left drive axles 6. In the example shown in FIG. 1, the vehicle Ve is constructed as a rear-wheel-drive vehicle that generates drive power by transmitting power generated by the engine 1 to the drive wheels 7 as rear wheels. The vehicle Ve in the embodiment of the disclosure may be a front-wheel-drive vehicle that generates drive power by transmitting power generated by the engine 1 to front wheels. In another example, the vehicle (Ve) may be a four-wheel-drive (all-wheel-drive) vehicle that generates drive power by transmitting power generated by the engine 1 to the front wheels and rear wheels, respectively.

The engine 1 is an internal combustion engine, such as a gasoline engine or a diesel engine. The engine 1 is configured such that adjustment of its output or power, and operation, such as start and stop, are electrically controlled. Where the engine 1 is a gasoline engine, the opening of a throttle valve, the amount of fuel supplied, execution and stop of ignition, ignition timing, etc. are electrically controlled. Where the engine 1 is a diesel engine, the opening of a throttle valve, the amount of fuel injected, fuel injection timing, etc. are electrically controlled.

The first clutch 2 is a so-called starting device provided between the engine 1 and the automatic transmission 3, and selectively transmits or cuts off power between the engine 1 and the automatic transmission 3. The first clutch 2 comprises a wet multiple-disc clutch using oil for cooling, and is excellent in the durability, heat resistance, and heat dissipation. More specifically, the first clutch 2, which is enlarged and shown in FIG. 2, consists principally of a plurality of friction plates 2a, 2b having friction material 2c, piston 2d, return spring (not shown), and so forth. The piston 2d is operable under hydraulic pressure (piston pressure), to press the friction plates 2a, 2b for engagement thereof. The return spring returns the piston 2d to its original position, to disengage the friction plates 2a, 2b from each other. In the example shown in FIG. 1 and FIG. 2, the friction plates 2a are coupled to the engine 1 side, and the friction plates 2b are coupled to the automatic transmission 3 side. The first clutch 2, which is a wet clutch mechanism having high durability as described above, is a fully dipped (oil bath type) clutch in which a clutch housing 2f that houses the friction plates 2a, 2b, piston 2d, etc. is filled with oil 2e for cooling the friction plates 2a, 2b, friction material 2c, etc. Namely, each member that constitutes the first clutch 2 is fully soaked in the oil; when the piston 2d makes a stroke, the required amount of oil for the stroke is pushed out from a clutch chamber.

Figure 2:
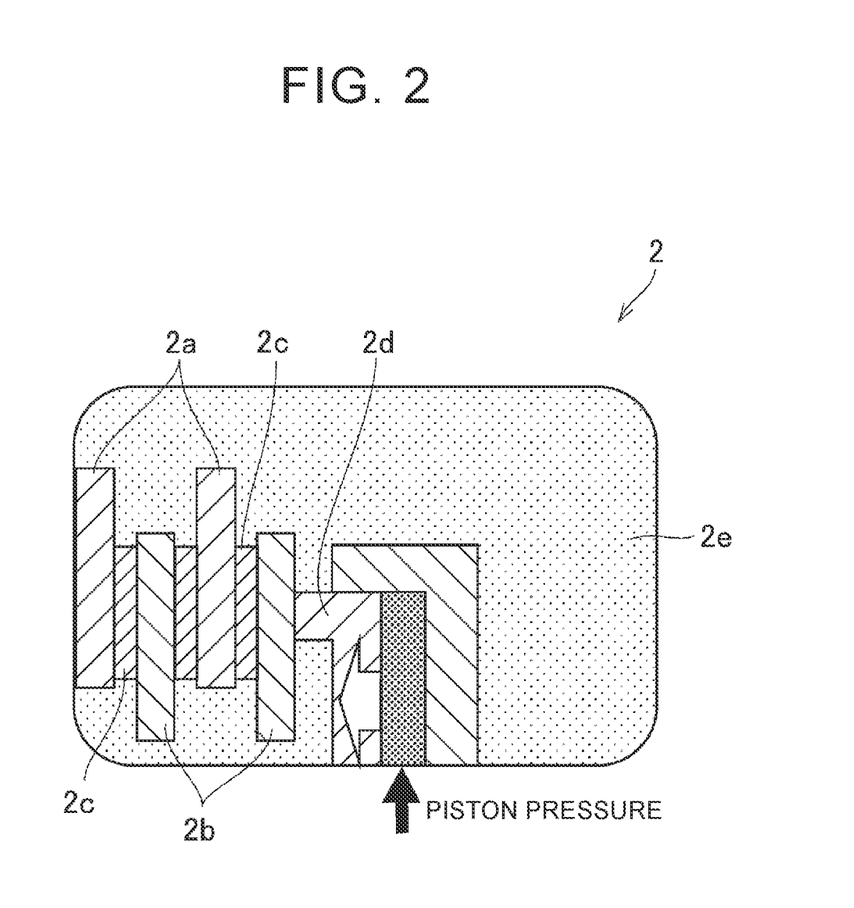
FIG. 2 is a view illustrating a first clutch shown in FIG. 1.

When the vehicle Ve includes a torque converter (not shown) as a starting device between the engine 1 and the automatic transmission 3, a lock-up clutch (not shown) provided in the torque converter may function as the first clutch 2 in the embodiment of the disclosure. In this case, too, the lock-up clutch comprises the wet multiple-disc clutch as described above.

The automatic transmission 3 is a conventional stepped automatic transmission 3 having two or more gear positions, and consists principally of a planetary gear mechanism (not shown), and a clutch and brake mechanism including a second clutch 8 that will be described later. Alternatively, the automatic transmission 3 in the embodiment of the disclosure may be a continuously variable transmission, such as a belt-type continuously variable transmission or a toroidal type continuously variable transmission, capable of continuously changing the speed ratio.

The automatic transmission 3, whichever type it is, has the second clutch 8 that selectively transmits and cuts off power between the input side and output side of the automatic transmission 3. For example, when the automatic transmission 3 is the stepped transmission using the planetary gear mechanism as described above, a clutch mechanism that selectively couples any two rotating elements in the automatic transmission 3 functions as the second clutch 8 in the embodiment of the disclosure. The second clutch 8 is a clutch mechanism that is directly coupled to the first clutch 2. The second clutch 8 is engaged to transmit power when a given gear position (or gear ratio) is established in the automatic transmission 3, and is released to cut off power transmission between the input shaft and the output shaft, to thus place the automatic transmission 3 in a neutral state. As in conventional automatic transmissions, shift control for establishing the gear positions is performed, based on a shift map that sets the gear positions according to the required drive power, such as the accelerator operation amount, and traveling conditions, such as the vehicle speed. Namely, the lower-speed gear position is established as the required drive power is larger, and the higher-speed gear position is established as the vehicle speed is higher.

Unlike the fully dipped clutch as the first clutch 2 having high durability as described above, the second clutch 8 is a shaft-center oil feed type clutch mechanism that supplies oil as needed from the axis of rotation (shaft center) to the friction plates and friction material. In sum, the second clutch 8 is configured such that the oil for lubrication flows in one direction from the radially inner side of the friction plates to the radially outer side, and the oil returns to the interior of the clutch housing 2f. Thus, the second clutch 8 is more excellent in the responsiveness than the first clutch 2.

An electronic control unit (ECU) 9 is provided for controlling the vehicle Ve. The electronic control unit 9 comprises a microcomputer, for example, as a main component. The electronic control unit 9 receives detection signals from an oil temperature sensor 10, clutch temperature sensor 11, shift position sensor 13, accelerator position sensor 14, and so forth. The oil temperature sensor 10 detects or estimates the temperature of the oil present around each clutch 2, 8. The clutch temperature sensor 11 detects or estimates the temperature of each clutch 2, 8. The shift position sensor 13 detects the shift position of the automatic transmission 3 which is set when a shift device 12 of the automatic transmission 3 is operated. The accelerator position sensor 14 detects the operation amount, operation speed, etc. of an accelerator device (not shown), such as an accelerator pedal. The electronic control unit 9 performs computations, using various input data, and data, calculation formulae, etc. stored in advance, and outputs the results of computations as control command signals, to thus control the vehicle Ve. In the example shown in FIG. 1, the electronic control unit 9 outputs the control command signals to the engine 1, respective clutches 2, 8, and the automatic transmission 3. While a single electronic control unit 9 is provided in the example of FIG. 1, two or more electronic control units 9 may be provided, for respective devices or instruments to be controlled, or for respective control contents, for example.

As described above, in a power transmission path of the vehicle Ve, the first clutch 2 in the form of the wet multiple-disc clutch is provided, as a starting device between the engine 1 and the automatic transmission 3. As described above, drag resistance is inevitably generated in the wet multiple-disc clutch, due to the presence of the oil 2e. In particular, the first clutch 2 in this embodiment of the disclosure is the fully dipped clutch; therefore, when the temperature of the oil is an extremely low temperature, or when the vehicle Ve is in a soaked state for a long time (when a period of time from stop of the engine to the next start is long), the viscosity of the oil 2e becomes higher, resulting in increase of the drag resistance in the first clutch 2. In this condition, if the vehicle Ve is started, using the first clutch 2 as the starting device, drag torque of the first clutch 2 is increased, which may result in deterioration of the acceleration performance at the start of the vehicle. On the other hand, if the vehicle Ve is started, using the second clutch 8 provided within the automatic transmission 3 as the starting device, the durability of the second clutch 8 may be reduced, since the second clutch 8 has poorer heat resistance than the first clutch 2, though it has the higher responsiveness. Thus, in this embodiment of the disclosure, start control is performed so as to appropriately start the vehicle Ve, while curbing reduction of response in acceleration, and also curbing reduction of the durability of each clutch 2, 8. More specifically, the electronic control unit 9 is configured to control starting of the vehicle Ve by coordinating the first clutch 2 having high durability with the second clutch 8 having high responsiveness. In the following, an example of the control will be described.

Figure 3:
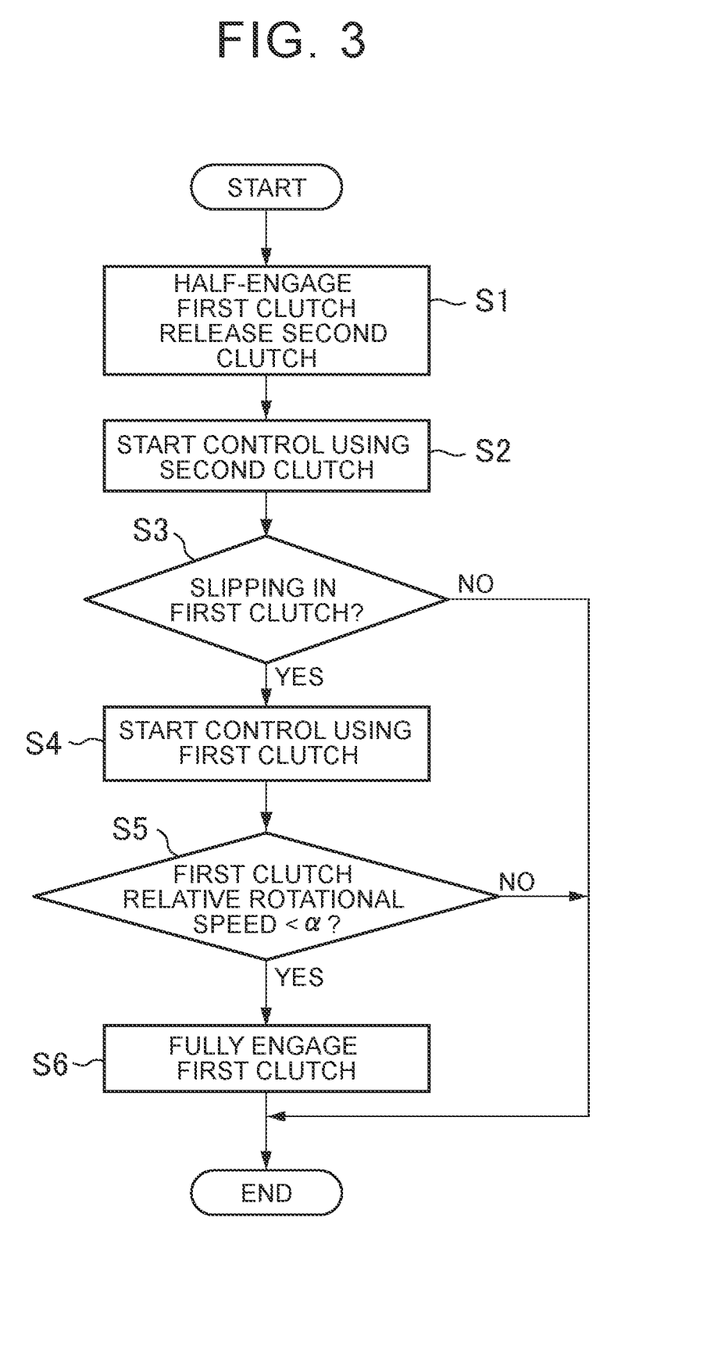
FIG. 3 is a flowchart illustrating one example of a control routine executed in the control system according to the embodiment of the disclosure.

FIG. 3 is a flowchart illustrating a control routine representing the control example. The control routine shown in the flowchart of FIG. 3 is executed when the vehicle Ve is started from a state in which the vehicle Ve is stopped. More specifically, when an engine start switch (such as an ignition key switch, or a push start switch) is turned ON, the engine 1 is started, and then operated at an idling speed. In this condition, the shift position is still the parking (P) position or neutral (N) position.

In this condition, initially, the electronic control unit 9 controls the clutch torque capacity (transmitted torque capacity) of the first clutch 2, so that the first clutch 2 is brought into a half-engaged state (or a state of slip slip engagement), and controls the second clutch 8 to a released state (step S1). Since the engine start switch is in the ON state, as described above, the vehicle Ve is supposed to be started. Thus, in a condition where the vehicle Ve is stopped, the first clutch 2 having poor responsiveness (in other words, having large drag torque) is controlled in advance to the half-engaged state. Here, the half-engaged state of the first clutch 2 will be described. Since the first clutch 2 is a fully dipped clutch, as described above, the drag torque is large, and the responsiveness is reduced accordingly. Thus, when the start control is performed using the first clutch 2, a delay in engagement appears. Thus, when the start control is performed with the first clutch 2, the clutch torque capacity is controlled in advance to provide a predetermined engagement pressure, in the condition where the vehicle Ve is stopped, so as to eliminate (or reduce) the delay in response. The clutch torque capacity at this time is equal to or larger than a torque capacity required to establish a condition where clearances between the friction plates of the clutch are eliminated, or a so-called packed state (which is also called "fast fill"). Also, the clutch torque capacity is large enough to ensure sufficient response in acceleration. Namely, when the vehicle Ve is started through control of the first clutch 2, the first clutch 2 is placed in a stand-by state where the engagement pressure is controlled to a level that does not cause the driver to sense a delay in acceleration. On the other hand, the second clutch 8 is placed in a state in which no gear position is formed in the automatic transmission 3, namely, in a released state, since the vehicle Ve is in the stopped state, and the shift position is the parking (P) position or neutral (N) position.

Then, the shift position is switched from the N position (or P position) to a drive (D) position, and the second clutch 8 starts being engaged, based on the driver's operation on the accelerator pedal, so that the vehicle Ve is started (step S2). More specifically, while the first clutch 2 is kept in the half-engaged state, the transmission torque capacity of the second clutch 8 is controlled to a target clutch torque corresponding to the driver's operation amount of the accelerator pedal. Namely, since the second clutch 8 is excellent in the responsiveness as described above, the vehicle Ve assures acceleration response according to the accelerator operation of the driver, by increasing the torque capacity of the second clutch 8.

As described above, the second clutch 8 is a clutch mechanism that places the automatic transmission 3 in the neutral state when it is released, and establishes a given gear position (or gear ratio) in the automatic transmission 3 when it is engaged. When the automatic transmission 3 includes two or more clutch mechanisms having such functions, any of the clutch mechanisms may be used as the second clutch 8. However, since the second clutch 8 is used when starting the vehicle Ve, it is appropriate to use a clutch mechanism that is engaged when establishing the lowest-speed gear position (or gear ratio) that can provide larger drive power for starting, as the second clutch 8.

Then, the electronic control unit 9 determines whether slipping occurs in the first clutch 2 (step S3). In this step, the electronic control unit 9 determines whether the clutch torque capacity of the second clutch 8 which gradually increases based on the accelerator operation of the driver has reached or exceeded the clutch torque capacity of the first clutch 2 that is controlled in advance to the half-engaged state. Namely, as the first clutch 2 starts slipping, torque transmitted to the drive wheels 7 is reduced, and the acceleration performance of the vehicle Ve deteriorates. Thus, when a negative decision (NO) is obtained in step S3, namely, when the electronic control unit 9 determines that no slipping occurs in the first clutch 2, it once finishes the control routine of FIG. 3, without executing further steps.

To the contrary, when an affirmative decision (YES) is obtained in step S3, namely, when the electronic control unit 9 determines that slipping has occurred in the first clutch 2, it performs start control using the first clutch 2 (step S4). More specifically, through execution of the above step S3, the clutch torque capacity of the second clutch 8 has exceeded the clutch torque capacity of the first clutch 2 placed in the half-engaged state; therefore, start control is performed with the first clutch 2 having high durability. Namely, while the electronic control unit 9 performs start control on the vehicle Ve, using the second clutch 8, until it reaches step S3, it switches the start control to a control mode in which starting is controlled by increasing the clutch torque capacity of the first clutch 2. As described above, in this embodiment of the disclosure, the electronic control unit 9 is configured to achieve both sufficient acceleration response and sufficient durability of the clutches. To this end, the acceleration response in the initial period of starting is secured by the second clutch 8 having high responsiveness, and then, the start control is performed with the first clutch 2 having high durability.

More specifically, the target torque of the first clutch 2 is obtained by adding clutch torque corresponding to the amount of the driver's accelerator operation to the clutch torque of the clutch 2 in the half-engaged state, and subtracting torque of the second clutch 8 at the time when slipping occurs in the first clutch 2 from the result of the addition. Also, the second clutch 8, which has poor durability, is immediately switched to the state of full engagement, without contributing to the start control in this and subsequent steps. Switching from a control mode using the second clutch 8 to the control mode using the first clutch 2 may be executed, in view of heat generating states of the first clutch 2 and second clutch 8 (the temperatures of the first clutch 2 and second clutch 8), acceleration requested by the driver, or the oil temperature. For example, when the clutch temperature of the first clutch 2 is higher than a predetermined reference value obtained from experimental values, etc., the period of the start control with the second clutch 8 is prolonged, in view of the durability of the first clutch 2. To the contrary, when the clutch temperature of the second clutch 8 is higher than a predetermined reference value, the period of the start control with the second clutch 8 is shortened, and switching to the start control with the first clutch 2 is executed earlier than normal. Also, when the requested acceleration based on the driver's accelerator operation is relatively small, the period of the start control with the first clutch 2 having high durability is prolonged. To the contrary, when the requested acceleration is relatively large, the start control with the second clutch 8 is prolonged. Namely, switching of the start control from the control mode using the second clutch 8 to the control mode using the first clutch 2 may be executed in view of the required acceleration response, and the durability of each clutch 2, 8. Namely, the clutch torque capacity of the first clutch 2 when it is in the half-engaged state during vehicle stop may be determined, according to the temperature of each clutch 2, 8 and the requested acceleration.

Then, the electronic control unit 9 determines whether the relative rotational speed of the first clutch 2 becomes less than a threshold value α (step S5). Namely, the electronic control unit 9 determines whether the first clutch 2 can be fully engaged. When an affirmative decision (YES) is obtained in step S5, namely, when the relative rotational speed is less than the threshold value α, the first clutch 2 is fully engaged, and the electronic control unit 9 finishes the start control with the first clutch 2 (step S6). The threshold value α is a rotational speed difference (about 50 rpm, for example) with which shock upon engagement can be allowed. On the other hand, when the relative rotational speed of the first clutch 2 is still equal to or greater than the threshold value α, and a negative decision (NO) is obtained in the above step S5, the electronic control unit 9 once finishes the control routine.

Figure 4:
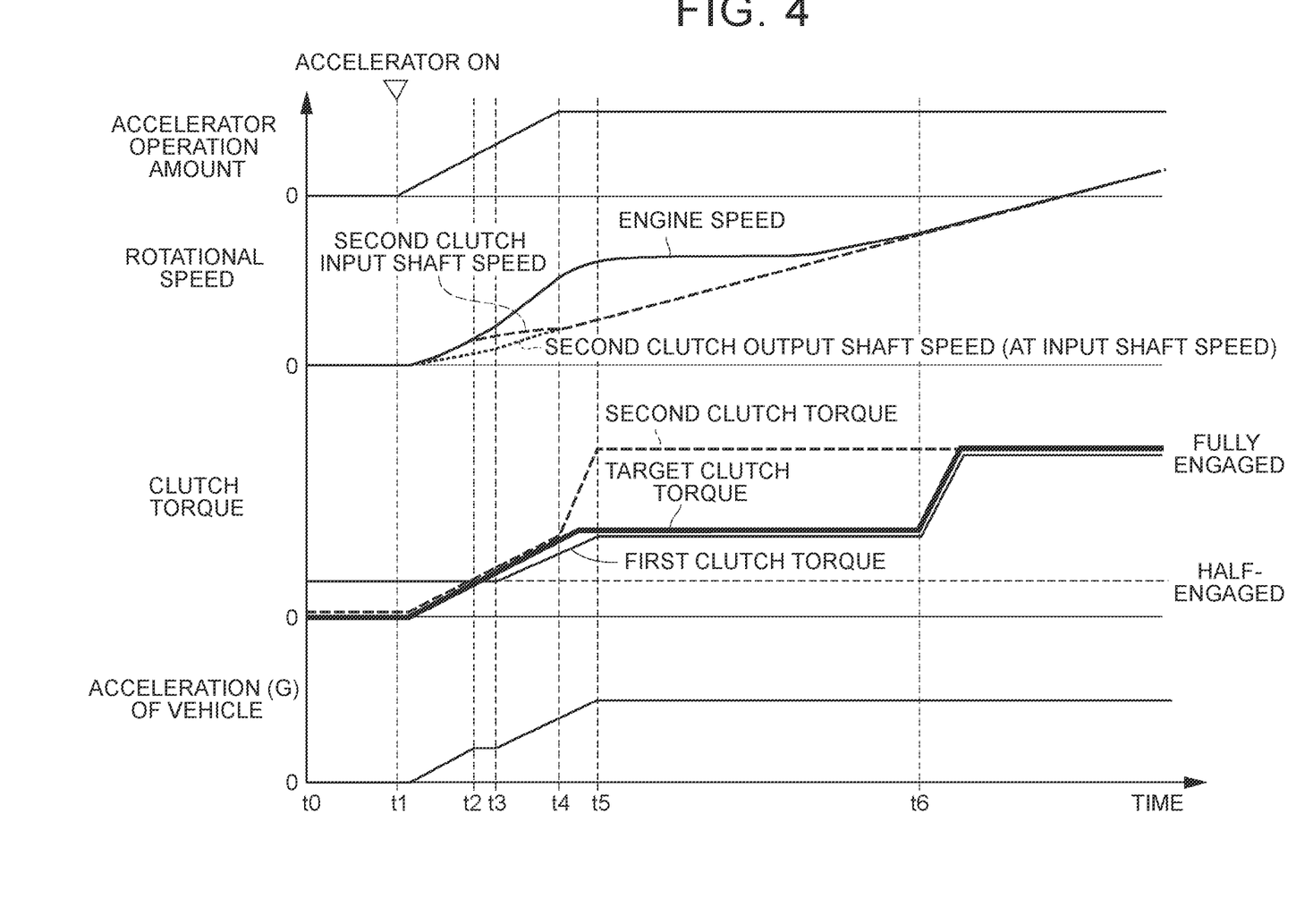
FIG. 4 is a view showing a time chart of the case where the control routine of FIG. 3 is executed.

Next, a time chart of the case where the control routine of the flowchart of FIG. 3 is performed will be described. FIG. 4 is a view showing one example of the time chart, and shows one example of changes in the accelerator operation amount when the vehicle Ve starts from the stopped state, each rotational speed of the engine and others, transmission torque capacity of each clutch 2, 8, and the acceleration G of the vehicle Ve. The time chart will be specifically described below.

Initially, at time t0, the engine start switch, such as an ignition key switch or a push start switch, is turned ON. In this condition, the accelerator operation is not performed; thus, the accelerator operation amount is equal to "0". Accordingly, each rotational speed and the acceleration are also kept being "0". In this embodiment of the disclosure, since starting of the vehicle Ve can be predicted when the engine stat switch is turned ON, as described above, the first clutch 2 having high durability is controlled in advance to the half-engaged state so as to achieve good response in acceleration. Accordingly, at time t0, the clutch torque capacity of the first clutch 2 is controlled to a predetermined torque capacity that places the clutch 2 in the half-engaged state. The clutch torque capacity that places the first clutch 2 in the half-engaged state is obtained by adding predetermined clutch torque to torque required for establishing the packed state as described above. Also, the torque capacity of the second clutch 8 having high responsiveness is controlled to "0" because the vehicle Ve has not been started yet, namely, the vehicle Ve is in the stopped state. In other words, at time t0, the shift position is N position (or P position), and the automatic transmission 3 is in the neutral state.

Then, when the accelerator operation is performed by the driver, the accelerator operation amount gradually increases (time t1). Namely, the shift position is switched from the N position (or P position) to the D position, and the start control with the second clutch 8 in the above step S2 is started. Thus, as the accelerator operation amount increases, the clutch torque capacity of the second clutch 8 is controlled so as to follow the target clutch torque. In this connection, the target clutch torque is based on the accelerator operation, and thus increases in proportion to the accelerator operation amount. Also, since the second clutch 8 is a shaft center oil feed type clutch having high responsiveness, it is possible to control the second clutch 8 so as to follow the target clutch torque. As a result, the acceleration G of the vehicle Ve changes in accordance with the accelerator operation of the driver, and becomes equal to the acceleration intended by the driver, from time t1 at which the accelerator is turned ON to time t2.

Also, in a period from time t1 to time t2, as the accelerator operation amount increases, the engine speed and the input shaft speed of the second clutch 8 (in other words, the output shaft speed of the first clutch 2) increase, and slipping occurs in the first clutch 2 at time t2. As described above with regard to step S3, slipping of the first clutch 2 occurs when the clutch torque capacity of the second clutch 8 which gradually increases toward the engagement pressure reaches the clutch torque capacity of the first clutch 2 that is in a half-engaged standby state, and exceeds the clutch torque capacity of the first clutch 2. Accordingly, at time t2, the input shaft speed of the second clutch 8 is reduced to be lower than the engine speed, and the clutch torque capacity of the second clutch 8 exceeds the clutch torque capacity of the first clutch 2.

Then, when the clutch torque capacity of the second clutch 8 exceeds the clutch torque capacity of the first clutch 2, the start control of the vehicle Ve is switched from the control mode using the second clutch 8 to the control mode using the first clutch 2. Namely, the initial acceleration response is secured by the second clutch 8 having high responsiveness, and the subsequent stage of the start control is performed with the first clutch 2 having high durability. Switching of the start control is performed from time t2 to time t3, and the acceleration G is held in a constant state (in other word, on a plateau) during the switching period.

Then, the start control of the vehicle Ve is performed with the first clutch 2 from time t3, and the clutch toque capacity of the first clutch 2 is controlled so as to follow (or be proportional to) the target clutch torque corresponding to the accelerator operation amount. In the time chart shown in FIG. 4, in a period from time t3 to time t4, the torque capacity of the first clutch 2 and the torque capacity of the second clutch 8 are controlled to change substantially at the same rate to be proportional to each other. This control is performed so as to reduce engagement shock that would appear if the clutch torque of the second clutch 8 is rapidly increased from time t2 so that the second clutch 8 is immediately fully engaged. Thus, in the example shown in FIG. 4, the clutch torque of the first clutch 2 and the clutch torque of the second clutch 8 are controlled so as to increase substantially at the same rate, until the input shaft speed of the second clutch 8 becomes substantially equal to the output shaft speed of the second clutch 8 (namely, the input shaft speed of the automatic transmission 3).

Then, when the input shaft speed of the second clutch 8 becomes equal to the input shaft speed of the automatic transmission 3 (at time t4), the torque of the second clutch 8 is increased, so that the second clutch 8 is fully engaged (from time t4 to time t5). As described above, the second clutch 8 is excellent in the responsiveness, but has low durability and low heat resistance because the surface of the clutch is not entirely soaked in the oil. Accordingly, it is preferable to fully engage the second clutch 8 as soon as possible, after the end of the start control with the second clutch 8. In the example shown in FIG. 4, the second clutch 8 is fully engaged, when the input shaft speed of the second clutch 8 becomes equal to the input shaft speed of the automatic transmission 3. In a period from time t2 to time t4, the torque capacity of the second clutch is not necessarily controlled so as to increase at the same rate as that of the first clutch 2, but may be controlled so that the second clutch 8 is immediately fully engaged from time t3, for example. With this control, reduction of the durability of the second clutch 8 can be further curbed.

On the other hand, in a period from time t3 to time t5, the engine speed gradually increases according to the accelerator operation of the driver, and the first clutch 2 is engaged so that the output torque of the engine 1 is gradually transmitted to the input shaft of the automatic transmission 3. As a result, the acceleration G of the vehicle Ve increases, and becomes equal to an acceleration corresponding to the accelerator operation. Then, at the time when the rotational speed of the input shaft of the automatic transmission 3 becomes equal to the engine speed, the first clutch 2 is fully engaged (at time t6). With the first clutch 2 thus engaged, power can be transmitted between the engine 1 and the drive wheels 7, in a condition where a given gear position (or gear ratio) for starting is established in the automatic transmission 3, and starting drive power for starting the vehicle Ve can be generated at the drive wheels 7. Thus, the start control is completed.

Next, the operation according to this embodiment of the disclosure will be described. As described above, in this embodiment of the disclosure, the first clutch 2 and the second clutch 8 are controlled in coordination with each other, when the vehicle Ve is started from the stopped state. More specifically, while the vehicle Ve is in the stopped state, the first clutch 2 that is a fully dipped clutch and has low responsiveness is placed in advance in the half-engaged state, and the start control is started with the second clutch 8 that is highly responsive to the accelerator operation. Namely, the acceleration response in the initial period of starting is secured through control of the second clutch 8. Then, when the clutch torque capacity of the second clutch 8 which is increased according to the accelerator operation exceeds the clutch torque capacity of the first clutch 2 that is in the half-engaged standby state (in other words, when slipping occurs in the first clutch 2), the start control of the vehicle Ve is switched from the control mode using the second clutch 8 to the control mode using the first clutch 2. Namely, once the initial response is secured by the second clutch 8, the second clutch 8 having relatively low durability is immediately fully engaged, so as not to do friction work, and the subsequent start control of the vehicle Ve is performed through control of the first clutch 2. Namely, since the first clutch 2, which has relatively low responsiveness, is placed in the half-engaged standby state in advance, a delay in response is eliminated or reduced when the start control is switched from the control mode using the second clutch 8 to the control mode using the first clutch 2. Also, since the first clutch 2 has high durability, most of the start control (namely, friction work) is performed by the first clutch 2, and the durability of each clutch (in particular, the second clutch 8) is less likely or unlikely to be reduced.

In sum, in this embodiment of the disclosure, each of the first and second clutches 2, 8 is controlled, in view of the advantage of each clutch 2, 8, namely, high durability of the first clutch 2, and high responsiveness of the second clutch 8. Thus, according to this embodiment, it is possible to ensure sufficient acceleration performance of the vehicle Ve and sufficient durability of each clutch 2, 8. Namely, unlike the known arrangement with which only the acceleration performance is ensured, or only the durability is ensured, it is possible to curb reduction of the durability of each clutch 2, 8, while ensuring sufficient acceleration response of the vehicle Ve.

While the embodiment of the disclosure has been described, the disclosure is not limited to the illustrated embodiment, but the embodiment may be changed as needed as long as the object of the disclosure is accomplished. While the control of each clutch 2, 8 when the vehicle Ve starts from the stopped state has been described above, the disclosure may be applied to the case where the vehicle is re-accelerated during coasting, for example. In this case, too, the initial response is ensured by use of the second clutch 8 having high responsiveness, and then, the start control is performed with the first clutch 2 controlled to a predetermined half-engaged state. Also, when the vehicle Ve is rapidly decelerated, the second clutch 8 in the automatic transmission 3 is released first, and then, the first clutch 2 is returned to the half-engaged state, so as to avoid engine stall.

In the illustrated embodiment, switching from the start control with the second clutch 8 to the start control with the first clutch 2 is determined when the clutch torque capacity of the second clutch 8 exceeds the clutch torque capacity of the first clutch 2 that is in the half-engaged standby state. Meanwhile, the switching of the start control takes place on a plateau (from time t2 to time t3) where the acceleration G of the vehicle Ve does not change. Namely, there is a period of time in which the accelerator operation amount increases, whereas the acceleration G of the vehicle Ve does not increase. Accordingly, the relationship between the first clutch 2 and the second clutch 8 may be learned and used for control, so as to reduce the plateau in the graph of the acceleration G. For example, when it is predicted that the torque capacity of the second clutch 8 reaches the torque capacity of the first clutch 2, control for increasing the clutch torque of the first clutch 2 is started before slipping occurs in the first clutch 2. As a result, the period of switching of the start control can be shortened, so that the plateau on which the acceleration G is constant can be eliminated or shortened.

When shudder, such as vibration or abnormal noise, is detected in the first clutch 2, the clutch torque of the second clutch 8 in the automatic transmission 3 is reduced to the clutch torque capacity with which torque can be transmitted to the drive wheels 7. In this manner, shudder or vibration can be reduced. Namely, with the clutch torque capacity thus reduced to a level that permits torque transmission, the second clutch 8 slips minutely, and torque variations are reduced. Also, with minute slipping occurring in the second clutch 8, the vibration frequency of shudder becomes a high frequency; as a result, abnormal noise or vibration sensed by the driver (or passenger) can be reduced. Similarly, when shock upon engagement of the clutch is reduced during re-acceleration of the vehicle, the torque capacity of the second clutch 8 in the automatic transmission 3 is reduced, so that the vibration frequency becomes a high frequency. As a result, the vibration damping period can be shortened.

While the disclosure is applied to the vehicle Ve including the engine 1 as the drive power source in the illustrated embodiment, the vehicle Ve may be a hybrid vehicle including the engine 1 and a motor as drive power sources, or an electric vehicle including only the motor as a drive power source.

What is claimed is:

1. A control system of a vehicle, the vehicle including
a drive power source,
drive wheels,
a first clutch of an oil bath type comprising a wet clutch filled with oil for cooling, the first clutch being configured to selectively transmit and cut off power on a power transmission path through which torque is transmitted between the drive power source and the drive wheels, and
a second clutch of a shaft-center oil feed type in which oil is suppled from a shaft center to friction plates, the second clutch being configured to selectively transmit and cut off power on the power transmission path, the control system comprising:
an electronic control unit, the electronic control unit being configured to
place the first clutch in a half-engaged state with a predetermined clutch torque capacity, when the vehicle is started,
perform start control in a first mode using the second clutch, by gradually increasing a clutch torque capacity of the second clutch from a released state,
switch the start control from the first mode using the second clutch to a second mode using the first clutch, when the increased clutch torque capacity of the second clutch reaches the clutch torque capacity of the first clutch, and
transmit output torque of the drive power source to the drive wheels, to generate drive power for starting, based on operation of the first clutch and operation of the second clutch.

2. The control system of the vehicle according to claim 1, wherein the electronic control unit is configured to:
control the first clutch to the half-engaged state in advance and perform the start control with the second clutch, when the vehicle is started; and
start the start control with the first clutch, and stop the start control with the second clutch, when slipping occurs in the first clutch.

3. The control system of the vehicle according to claim 1, wherein the electronic control unit is configured to increase the clutch torque capacity of the second clutch so as to fully engage the second clutch, when the clutch torque capacity of the second clutch reaches the clutch torque capacity of the first clutch.

4. The control system of the vehicle according to claim 1, wherein the electronic control unit is configured to determine the predetermined clutch torque capacity of the first clutch placed in the half-engaged state, based on at least one of a temperature of the first clutch, a temperature of the second clutch, a temperature of the oil, and an acceleration required of the vehicle.

5. The control system of the vehicle according to claim 1, wherein the electronic control unit is configured to perform control for establishing the half-engaged state of the first clutch, in a condition where the vehicle is stopped.

6. The control system of the vehicle according to claim 1, wherein the first clutch has higher durability than the second clutch, and the second clutch has higher responsiveness than the first clutch.

7. The control system of the vehicle according to claim 1, wherein:
the vehicle includes an automatic transmission on the power transmission path;
the second clutch is provided within the automatic transmission; and
the first clutch is provided between the drive power source and the automatic transmission.

8. The control system of the vehicle according to claim 7, wherein the electronic control unit is configured to fully engage the second clutch, when an input shaft speed of the second clutch becomes substantially equal to an input shaft speed of the automatic transmission.

9. The control system of the vehicle according to claim 1, wherein the first clutch and the second clutch are directly coupled to each other on the power transmission path.

10. A control method for a vehicle, the vehicle including a drive power source, drive wheels, a first clutch of an oil bath type which comprises a wet clutch filled with oil for cooling, and is configured to selectively transmit and cut off power on a power transmission path through which torque is transmitted between the drive power source and the drive wheels, and a second clutch of a shaft-center oil feed type in which oil is suppled from a shaft center to friction plates, the second clutch being configured to selectively transmit and cut off power on the power transmission path, the control method comprising:
placing the first clutch in a half-engaged state with a predetermined clutch torque capacity, when the vehicle is started,
performing start control in a first mode using the second clutch, by gradually increasing a clutch torque capacity of the second clutch from a released state,
switching the start control from the first mode using the second clutch to a second mode using the first clutch, when the increased clutch torque capacity of the second clutch reaches the clutch torque capacity of the first clutch, and
transmitting output torque of the drive power source to the drive wheels, to generate drive power for starting, based on operation of the first clutch and operation of the second clutch.

* * * * *